(12) United States Patent
An (10) Patent No.: US 12,354,367 B2
(45) Date of Patent: Jul. 8, 2025

(54) COMMUNICATION SYSTEM OF VEHICLE FOR DETECTING OBSTACLE AND CONTROL METHOD THEREOF

(71) Applicants: HYUNDAI MOTOR COMPANY, Seoul (KR); KIA CORPORATION, Seoul (KR)

(72) Inventor: Daeyun An, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 353 days.

(21) Appl. No.: 17/404,445

(22) Filed: Aug. 17, 2021

(65) Prior Publication Data
US 2022/0067402 A1  Mar. 3, 2022

(30) Foreign Application Priority Data
Sep. 2, 2020  (KR) .......... 10-2020-0111368

(51) Int. Cl.
| G06V 20/58 | (2022.01) |
| G01S 13/02 | (2006.01) |
| G01S 13/931 | (2020.01) |
| G07C 9/00 | (2020.01) |

(52) U.S. Cl.
CPC .......... *G06V 20/58* (2022.01); *G01S 13/0209* (2013.01); *G01S 13/931* (2013.01); *G07C 9/00309* (2013.01); *G01S 2013/9327* (2020.01); *G07C 2209/63* (2013.01)

(58) Field of Classification Search
CPC ... G06V 20/58; G01S 13/0209; G01S 13/931; G01S 2013/9327; G07C 9/00309; G07C 2209/63
See application file for complete search history.

(56) References Cited

U.S. PATENT DOCUMENTS

| 10,723,315 | B2 * | 7/2020 | Ishikawa | ................. B60R 25/10 |
| 2009/0079557 | A1 * | 3/2009 | Miner | .................... B60N 2/002 |
| | | | | 340/457.1 |
| 2012/0182175 | A1 * | 7/2012 | Krapf | .................. G01S 13/0209 |
| | | | | 342/118 |

(Continued)

FOREIGN PATENT DOCUMENTS

| CN | 105564372 A | 5/2016 |
| CN | 106685453 A | 5/2017 |

(Continued)

OTHER PUBLICATIONS

Office Action dated Jun. 28, 2024, issued for the corresponding Chinese patent application 202110524360.1.

(Continued)

*Primary Examiner* — William Kelleher
*Assistant Examiner* — Noah Yi Min Zhu
(74) *Attorney, Agent, or Firm* — Morgan, Lewis & Bockius LLP (57) ABSTRACT

A vehicle includes: a plurality of Ultra Wide Band (UWB) transceivers; and a controller configured to control the plurality of UWB transceivers to selectively operate, based on location information of a mobile key in which the UWB function is embedded, in at least one of a first mode for communication and a second mode for detecting an obstacle.

15 Claims, 8 Drawing Sheets

(56) References Cited

U.S. PATENT DOCUMENTS

| | | | |
|---|---|---|---|
| 2014/0330449 A1* | 11/2014 | Oman | B60R 25/245 |
| | | | 701/2 |
| 2016/0121849 A1* | 5/2016 | Kim | B60R 25/24 |
| | | | 701/2 |
| 2017/0228952 A1 | 8/2017 | Ellis et al. | |
| 2020/0125085 A1* | 4/2020 | Yun | B60W 50/087 |
| 2020/0192362 A1* | 6/2020 | Murad | G06V 20/586 |
| 2020/0198580 A1 | 6/2020 | Saleh et al. | |
| 2020/0310407 A1* | 10/2020 | Van Wiemeersch | |
| | | | B62D 15/0285 |
| 2020/0408009 A1* | 12/2020 | Bussis | E05B 81/78 |
| 2021/0003661 A1* | 1/2021 | Xu | G01S 13/931 |
| 2021/0003662 A1* | 1/2021 | Aydogdu | G01S 13/343 |
| 2021/0021295 A1* | 1/2021 | Yun | H04B 1/401 |
| 2021/0046900 A1* | 2/2021 | Ette | G06N 3/04 |
| 2021/0107380 A1* | 4/2021 | Jo | B60R 25/241 |
| 2023/0018226 A1* | 1/2023 | Schmidt | G01S 13/88 |

FOREIGN PATENT DOCUMENTS

| | | | |
|---|---|---|---|
| CN | 111532231 A | 8/2020 | |
| JP | 2019-203785 A | 11/2019 | |
| JP | 2020-118030 A | 8/2020 | |
| KR | 10-1601524 B1 | 3/2016 | |

OTHER PUBLICATIONS

Office Action dated Jan. 13, 2025, issued for the corresponding Korean patent application KR 10-2020-011136.

* cited by examiner

| DRIVER LOCATION | | | RTG | OPERATION | | REMARK |
|---|---|---|---|---|---|---|
| INDOOR | OUTDOOR | OUTSIDE DETECTION AREA | WHETHER IT WORKS | INDOOR UWB | OUTDOOR UWB | |
| ○ | × | × | × | COMMUNICATION | RADAR | PAS FUNCTION, ETC. |
| ○ | × | × | ○ | COMMUNICATION | RADAR | |
| LOCATED AT BOUNDARY | | × | × | COMMUNICATION | COMMUNICATION / RADAR | |
| × | ○ | × | × | COMMUNICATION / RADAR | COMMUNICATION / RADAR | |
| × | ○ | × | × | COMMUNICATION / RADAR (DRIVER DETECTION ×) | COMMUNICATION / RADAR | |
| × | ○ | × | ○ | COMMUNICATION / RADAR | COMMUNICATION / RADAR | LOCATION AROUND DRIVER |
| × | × | ○ | × | RADAR | COMMUNICATION | OTHER THAN PAS FUNCTION |
| × | × | ○ | ○ | COMMUNICATION / RADAR | COMMUNICATION / RADAR | |

FIG. 8

COMMUNICATION SYSTEM OF VEHICLE FOR DETECTING OBSTACLE AND CONTROL METHOD THEREOF

CROSS-REFERENCE TO RELATED APPLICATION

This application is based on and claims the benefit of priority to Korean Patent Application No. 10-2020-0111368, filed on Sep. 2, 2020 in the Korean Intellectual Property Office, the disclosure of which is incorporated herein by reference.

TECHNICAL FIELD

The disclosure relates to a vehicle and a control method thereof.

BACKGROUND

In vehicles, the Ultra Wide Band (UWB) technology field has been proposed as a communication use for external security and attack prevention in a mobile key.

In addition to the mobile key function, development is still in progress to utilize additional functions.

The information included in this Background section is only for enhancement of understanding of the general background of the present disclosure and may not be taken as an acknowledgement or any form of suggestion that this information forms the prior art already known to a person skilled in the art.

SUMMARY

In development of the current situation, according to an embodiment of the present disclosure, an UWB technology is used for communication or for radar as necessary, thereby increasing UWB utilization.

In accordance with one aspect of the disclosure, a vehicle includes: a plurality of Ultra Wide Band (UWB) transceivers; and a controller configured to control the plurality of UWB transceivers to selectively operate, based on location information of a mobile key which is configured to perform a UWB function, in at least one of a first mode for communication or a second mode for detecting an obstacle.

The some of the plurality of UWB transceivers may be mounted inside the vehicle, and the rest may be mounted outside the vehicle.

The plurality of UWB transceivers may include a transmitter and a receiver.

When it is determined that the mobile key is located inside the vehicle, the controller may be configured to control the plurality of UWB transceivers mounted inside the vehicle so that the plurality of UWB transceivers mounted inside the vehicle operate in the first mode.

When it is determined that the mobile key is located inside the vehicle, the controller may be configured to control the plurality of UWB transceivers mounted outside the vehicle so that the plurality of UWB transceivers mounted outside the vehicle operate in the second mode.

When it is determined that the mobile key is located outside the vehicle and is located within the UWB communication range, the controller may be configured to determine whether the mobile key is located within a predetermined distance with respect to the tail gate of the vehicle.

When it is determined that the mobile key is located outside the vehicle, is located within the UWB communication range, and the mobile key is not located within a predetermined distance with respect to the tail gate of the vehicle, the controller may be configured to control the plurality of UWB transceivers mounted inside the vehicle so that the plurality of UWB transceivers mounted inside the vehicle operate in at least one of the first mode and the second mode.

When it is determined that the mobile key is located outside the vehicle, is located within the UWB communication range, and the mobile key is not located within a predetermined distance with respect to the tail gate of the vehicle, the controller may be configured to control the plurality of UWB transceivers mounted outside the vehicle so that the plurality of UWB transceivers mounted outside the vehicle operate in at least one of the first mode and the second mode.

When it is determined that the mobile key is located outside the vehicle, is located within the UWB communication range, and the mobile key is located within a predetermined distance with respect to the tail gate of the vehicle, the controller may be configured to control the plurality of UWB transceivers mounted inside the vehicle so that the plurality of UWB transceivers mounted inside the vehicle operate in the second mode.

When it is determined that the mobile key is located outside the vehicle, is located within the UWB communication range, and the mobile key is located within a predetermined distance with respect to the tail gate of the vehicle, the controller may be configured to control the plurality of UWB transceivers mounted outside the vehicle so that the plurality of UWB transceivers mounted outside the vehicle operate in at least one of the first mode and the second mode.

When it is determined that the mobile key is not located within the UWB communication range, the controller may be configured to control the plurality of UWB transceivers mounted inside the vehicle so that the plurality of UWB transceivers mounted inside the vehicle operate in the second mode.

When it is determined that the mobile key is not located within the communication range of the vehicle, the controller may be configured to control the plurality of UWB transceivers mounted outside the vehicle so that the plurality of UWB transceivers mounted outside the vehicle operate in the first mode.

In accordance with another aspect of the disclosure, a control method of a vehicle includes: obtaining location information of a mobile key from a plurality of Ultra Wide Band (UWB) transceivers; determining location information of the mobile key which is configured to perform a UWB function; and controlling the plurality of UWB transceivers to selectively operate, based on the location information of the mobile key, in at least one of a first mode for communication or a second mode for detecting an obstacle.

The some of the plurality of UWB transceivers may be mounted inside the vehicle, and the rest may be mounted outside the vehicle.

The plurality of UWB transceivers may include a transmitter and a receiver.

The control method may further include: when it is determined that the mobile key is located inside the vehicle, controlling the plurality of UWB transceivers mounted inside the vehicle so that the plurality of UWB transceivers mounted inside the vehicle operate in the first mode; and controlling the plurality of UWB transceivers mounted outside the vehicle so that the plurality of UWB transceivers mounted outside the vehicle operate in the second mode.

The control method may further include: when it is determined that the mobile key is located outside the vehicle and is located within the UWB communication range, determining whether the mobile key is located within a predetermined distance with respect to the tail gate of the vehicle.

The control method may further include: when it is determined that the mobile key is located outside the vehicle, is located within the UWB communication range, and the mobile key is not located within a predetermined distance with respect to the tail gate of the vehicle, controlling the plurality of UWB transceivers mounted inside the vehicle so that the plurality of UWB transceivers mounted inside the vehicle operate in at least one of the first mode and the second mode; and controlling the plurality of UWB transceivers mounted outside the vehicle so that the plurality of UWB transceivers mounted outside the vehicle operate in at least one of the first mode and the second mode.

The control method may further include: when it is determined that the mobile key is located outside the vehicle, is located within the UWB communication range, and the mobile key is located within a predetermined distance with respect to the tail gate of the vehicle, controlling the plurality of UWB transceivers mounted inside the vehicle so that the plurality of UWB transceivers mounted inside the vehicle operate in the second mode; and controlling the plurality of UWB transceivers mounted outside the vehicle so that the plurality of UWB transceivers mounted outside the vehicle operate in at least one of the first mode and the second mode.

The control method may further include: when it is determined that the mobile key is not located within the UWB communication range, controlling the plurality of UWB transceivers mounted inside the vehicle so that the plurality of UWB transceivers mounted inside the vehicle operate in the second mode; and controlling the plurality of UWB transceivers mounted outside the vehicle so that the plurality of UWB transceivers mounted outside the vehicle operate in the first mode.

BRIEF DESCRIPTION OF THE DRAWINGS

These and/or other aspects of the disclosure will become apparent and more readily appreciated from the following description of the embodiments, taken in conjunction with the accompanying drawings.

DETAILED DESCRIPTION

Like reference numerals refer to like elements throughout the specification. Not all elements of embodiments of the disclosure will be described, and description of what are commonly known in the art or what overlap each other in the embodiments will be omitted. The terms as used throughout the specification, such as "~ part," "~ module," "~ member," "~ block," etc., may be implemented in software and/or hardware, and a plurality of "~ parts," "~ modules," "~ members," or "~ blocks" may be implemented in a single element, or a single "~ part," "~ module," "~ member," or "~ block" may include a plurality of elements.

It will be understood that when an element is referred to as being "connected" to another element, it can be directly or indirectly connected to the other element, wherein the indirect connection includes "connection" via a wireless communication network.

When a part "includes" or "comprises" an element, unless there is a particular description contrary thereto, the part may further include other elements, not excluding the other elements.

Throughout the specification, when a member is said to be positioned "on" another member, this includes not only the case where the member is in contact with the other member, but also the case where another member exists between the two members.

It will be understood that, although the terms first, second, third, etc., may be used herein to describe various elements, it should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise.

Hereinafter, the operation principles and embodiments of the disclosure will be described with reference to the accompanying drawings.

Figure 1:
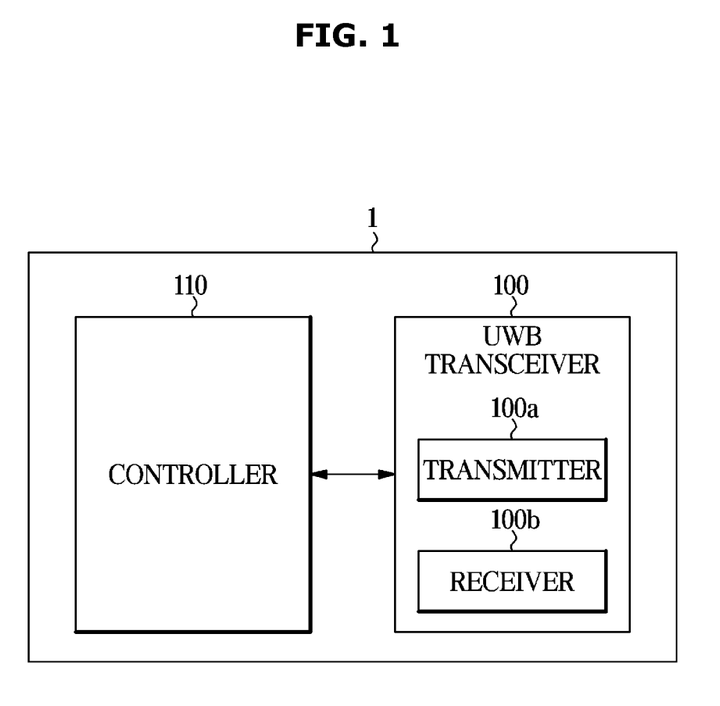
FIG. 1 is a control block diagram of a vehicle according to an embodiment of the present disclosure.
Figure 2:
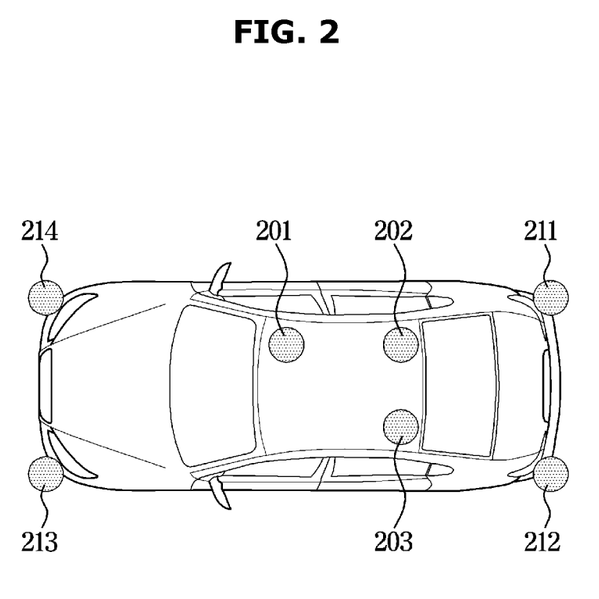
FIG. 2 is a plan view of a vehicle equipped with a UWB transceiver according to an embodiment of the present disclosure.

FIG. 1 is a control block diagram of a vehicle according to an embodiment of the present disclosure. FIG. 2 is a plan view of a vehicle equipped with a UWB transceiver according to an embodiment of the present disclosure.

As shown in FIG. 1 and FIG. 2, the vehicle 1 according to an embodiment of the present disclosure may include a controller that controls the plurality of UWB transceivers to selectively operate in at least one of a first mode for communication or a second mode for detecting an obstacle based on the location information of a plurality of Ultra Wide Band (UWB) transceivers and a mobile key with the UWB function embedded. Here, the vehicle 1 may include a plurality of UWB transceivers, and the mobile key may include a smart key.

Some of the plurality of UWB transceivers 100 may be mounted inside the vehicle 1. For example, the plurality of UWB transceivers 100 mounted inside the vehicle 1 may include a first UWB transceiver 201, a second UWB transceiver 202, and a third UWB transceiver 203.

Referring to FIG. 2, the vehicle 1 according to an embodiment of the present disclosure includes a first UWB transceiver 201 mounted around a passenger seat, a second UWB transceiver 202 mounted on a rear seat, and a third UWB transceiver 203, but the mounting position and number of the UWB transceiver 100 may vary depending on the performance of the UWB transceiver 100, the size and the internal structure of the vehicle 1.

The rest of the plurality of UWB transceivers 100 may be mounted outside the vehicle 1. For example, the plurality of UWB transceivers 100 mounted outside the vehicle 1 may include a fourth UWB transceiver 211, a fifth UWB transceiver 212, a sixth UWB transceiver 213, and a seventh UWB transceiver 214.

Referring to FIG. 2, the vehicle 1 according to an embodiment of the present disclosure includes a sixth UWB transceiver 213 and a seventh UWB transceiver 214 mounted around a front light of the vehicle 1, a fourth UWB transceiver 211, and a fifth UWB transceiver 212 mounted around the rear light of the vehicle 1, but the mounting position and number of the UWB transceiver 100 may vary depending on the performance of the UWB transceiver 100, the size and an external structure of the vehicle 1.

The UWB transceiver 100 may include a transmitter 100a and a receiver 100b. The transmitter 100a may transmit a first UWB signal (hereinafter referred to as "authentication signal") for communication with the mobile key of the vehicle 1 and a second UWB signal (hereinafter referred to as "detection signal") for detecting an object.

In this case, both the authentication signal and the detection signal may be signals generated based on a UWB impulse signal. Here, the authentication signal and the detection signal may be signals of different frequency bands, and may be transmitted through different transmission channels.

The transmitter 100a may transmit the authentication signal in all directions and may transmit the detection signal in a direction concentrated in a detection area.

The receiver 100b may include a first antenna (not shown) capable of receiving the authentication signal transmitted from the mobile key of the vehicle 1. For example, the authentication signal transmitted from the mobile key may include a UWB signal, and the first antenna may include a UWB antenna. In more detail, the first antenna (not shown) may receive an authentication signal transmitted from a transponder of the mobile key.

The receiver 100b may include a second antenna (not shown) for receiving the detection signal reflected from the object when the detection signal transmitted from the transmitter 100a is reflected from the object. The second antenna may include a UWB antenna. In more detail, the second antenna (not shown) may receive the detection signal (hereinafter referred to as "reflection signal") reflected from an object.

The first antenna and the second antenna may be provided in each of the receiver 100b, but may be provided as one integrated antenna.

The UWB transceiver 100 may include a switching unit (not shown). The switching unit (not shown) may selectively employ a first antenna or a second antenna based on a control signal of the controller 110.

The mobile key is a device including a communication transceiver capable of transmitting the authentication signal corresponding to the vehicle 1, and may include an FOB key of the vehicle 1 and/or a user terminal. The user terminal may be interlocked with the vehicle 1 through communication with the vehicle 1, and may include a portable terminal capable of accessing the vehicle 1 through a network. For example, the user terminal may include all types of hand-held-based wireless communication device such as a smart phone, and a wearable device such as a watch, a ring, a bracelet, a anklet, a necklace, glasses, a contact lens, or a head-mounted-device (HMD).

The controller 110 may obtain location information of a mobile key using a Time of Flight (ToF) method for an authentication signal received from a first antenna included in the receiver 100b of the UWB module 100.

In addition, the controller 110 may obtain location information of the mobile key using a Time of Arrival (TOA), Time Difference of Arrival (TDOA), Angle of Arrival (AOA), or Received Signal Strength Indicator (RSSI) method.

In more detail, the controller 110 may determine not only the distance between the vehicle 1 and the mobile key, but also the accurate location of the mobile key. For example, when using the first antenna included in the receiver 100b of three UWB transceivers (100), the controller 110 may determine the distance between each UWB transceiver 100 and the mobile key based on the authentication signal received from each of the three receivers, and may obtain accurate location information of a mobile key based on a distance between each UWB transceiver 100 and the mobile key.

Hereinafter, a method of controlling the plurality of UWB transceivers 100 to operate in at least one of a first mode in which the controller 110 communicates with the mobile key based on the authentication signal transmitted from the mobile key based on location information of the mobile key or a second mode for transmitting a detection signal toward an object and detecting the object based on the detection signal reflected from the object will be described.

When it is determined that the mobile key is located inside the vehicle 1, the controller 110 may control the plurality of UWB transceivers 201, 202, and 203 mounted inside the vehicle 1 so that the plurality of UWB transceivers 201, 202 and 203 operate in first mode.

The controller 110 may control the plurality of UWB transceivers 211, 212, 213 and 214 mounted outside the vehicle 1 so that the plurality of UWB transceivers 211, 212, 213 and 214 operate in second mode. For example, the second mode may be to perform a Parking assistance system (PAS) function or a Real Cross-Traffic Collision-Avoidance-Assist (RCCA) function, but is not limited thereto.

If it is determined that the mobile key is located outside of the vehicle 1, the controller 110 may determine whether the mobile key is located within a communication range.

If it is determined that the mobile key is located outside of the vehicle but not located within the communication range, the controller 110 may control the plurality of UWB transceivers 201, 202, and 203 mounted inside the vehicle 1 so that the plurality of UWB transceivers 201, 202 and 203 operate in second mode. For example, the second mode may be a Real Occupant Alert (ROA) function, but is not limited thereto. In this case, the controller 110 may control to perform the ROA function until it is determined that the mobile key is located within the communication range.

If the mobile key is located outside the vehicle, but it is determined that it is located inside the communication range, the controller 110 may determine whether the mobile key is located within a predetermined distance with respect to the tail gate of the vehicle 1.

If it is determined that the mobile key is not located within a predetermined distance with respect to the tail gate of the vehicle 1, the controller 110 may control the plurality of UWB transceivers 201, 202, and 203 mounted inside the vehicle 1 so that the plurality of UWB transceivers 201, 202 and 203 operate in at least one of a first mode and a second mode. For example, the second mode may be Rear Occupant Alert (ROA), but is not limited thereto. At this time, the controller 110 may control the plurality of UWB transceivers 201, 202, and 203 mounted inside the vehicle 10 in a standby mode for performing an ROA function.

The controller 110 may control the plurality of UWB transceivers 211, 212, 213 and 214 mounted outside the vehicle 1 so that the plurality of UWB transceivers 211, 212, 213 and 214 operate in at least one of a first mode and a second mode. For example, the second mode may be to perform a Parking assistance system (PAS) function or a Real Cross-Traffic Collision-Avoidance-Assist (RCCA) function, but is not limited thereto.

In more detail, the controller 110 may control to operate by dividing the first mode and the second mode by using a time division in any one of a plurality of UWB transceivers 211, 212, 213 and 214 mounted outside of the vehicle 1.

If it is determined that the mobile key is located within a predetermined distance with respect to the tail gate of the vehicle 1, the controller 110 may control the plurality of UWB transceivers 201, 202, and 203 mounted inside the vehicle 1 so that the plurality of UWB transceivers 201, 202 and 203 operate in a second mode. For example, the second mode may be Rear Occupant Alert (ROA). At this time, the controller 110 may control the plurality of UWB transceivers 201, 202, and 203 mounted inside the vehicle 10 in a standby mode for performing an ROA function.

The controller 110 may control the plurality of UWB transceivers 211, 212, 213 and 214 mounted outside the vehicle 1 so that the plurality of UWB transceivers 211, 212, 213 and 214 operate in at least one of a first mode and a second mode.

On the other hand, the controller 110 may be implemented with a memory (not shown) that stores an algorithm for controlling the operation of the components in the vehicle 1 or data on a program that reproduces the algorithm, and a processor (not shown) that performs the above-described operation using the data stored in the memory. In this case, the memory and the processor may be implemented as separate chips, respectively. Alternatively, the memory and the processor may be implemented as a single chip.

FIGS. 3 to 6 are plan views showing a location of a smart key in a vehicle equipped with a UWB transceiver according to an embodiment of the present disclosure.

Figure 3:
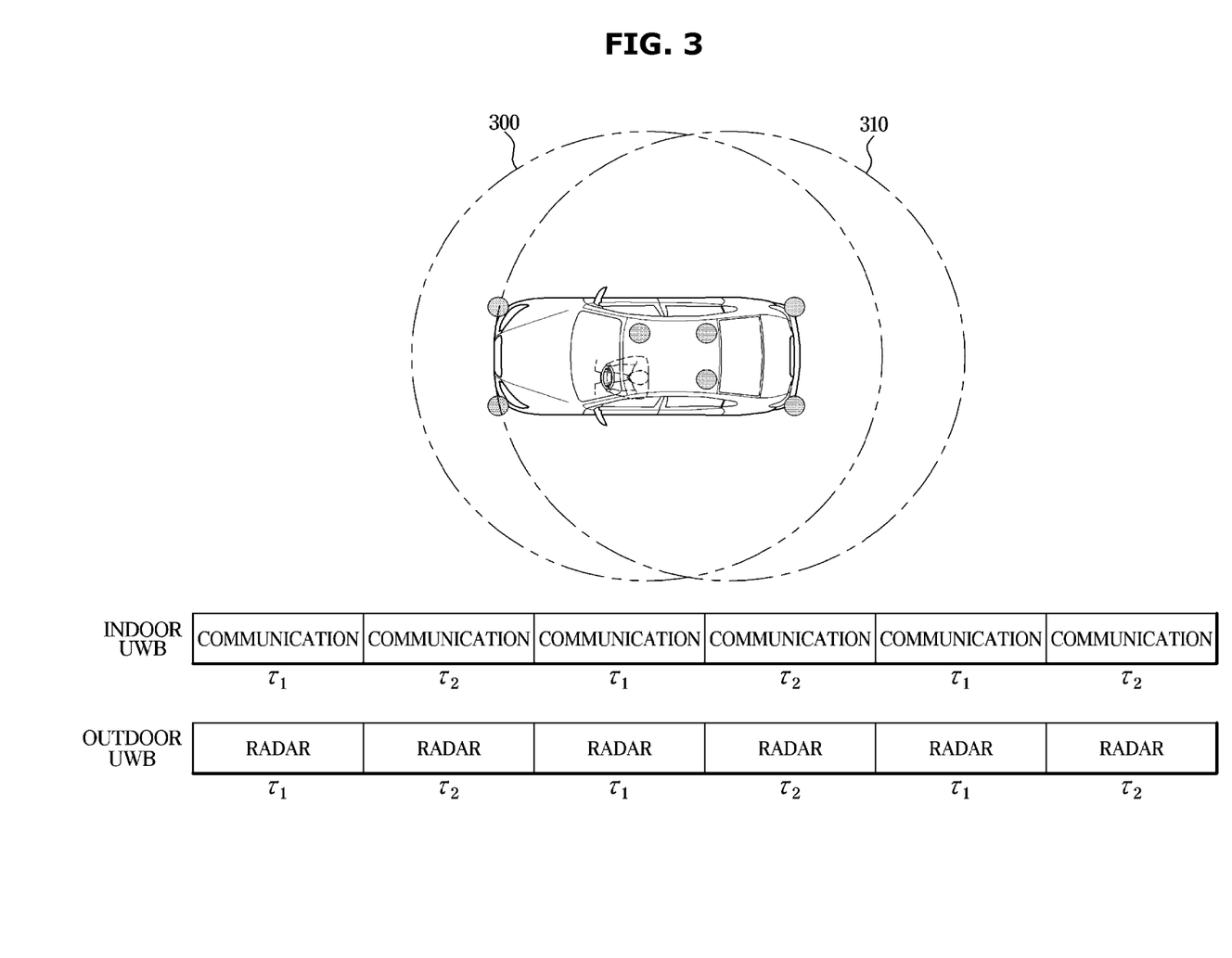
FIG. 3 is a plan view showing a location of a smart key in a vehicle equipped with a UWB transceiver according to an embodiment of the present disclosure.

Referring to FIG. 3, a case where it is determined that the driver possessing the mobile key is located inside of the communication range 300 of a plurality of UWB transceivers 201, 202, 203 mounted inside the vehicle 1, inside of the communication range 310 of a plurality of UWB transceivers 211, 212, 213, 214 mounted outside of the vehicle 1 and inside the vehicle 1 is shown.

The vehicle 1 may control the first UWB transceiver 201, the second UWB transceiver 202, and the third UWB transceiver 203 mounted inside the vehicle 1 to operate in a first mode.

The vehicle 1 may control the fourth UWB transceiver 211, the fifth UWB transceiver 212, the sixth UWB transceiver 213, and the seventh UWB transceiver 214 mounted outside of the vehicle 1 to operate in the second mode. For example, the second mode may be to perform a Parking assistance system (PAS) function or a Real Cross-Traffic Collision-Avoidance-Assist (RCCA) function, but is not limited thereto.

Figure 4:
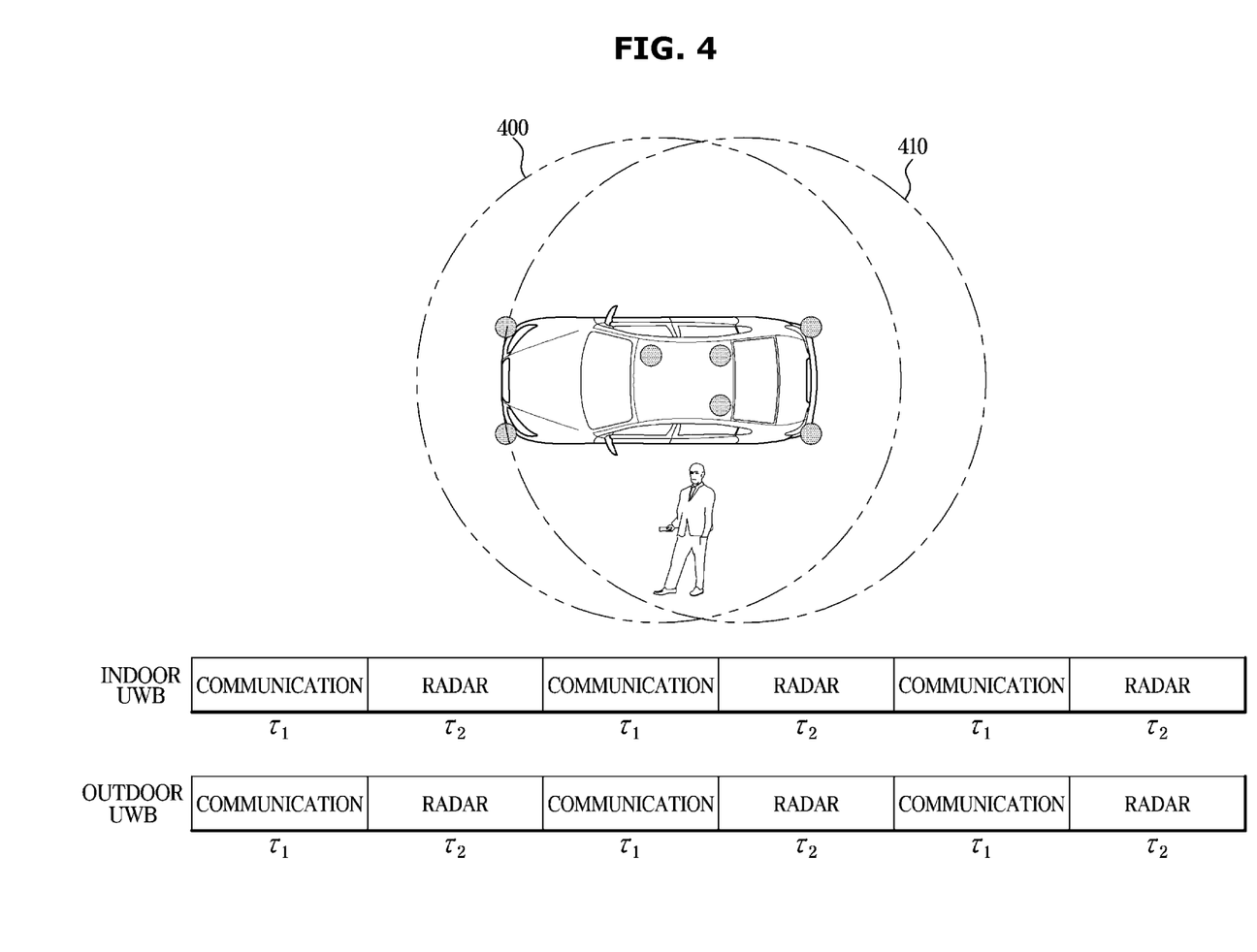
FIG. 4 is a plan view showing a location of a smart key in a vehicle equipped with a UWB transceiver according to an embodiment of the present disclosure.

Referring to FIG. 4, a case where it is determined that the driver possessing the mobile key is located inside of the communication range 400 of a plurality of UWB transceivers 201, 202, 203 mounted inside the vehicle 1, inside of the communication range 410 of a plurality of UWB transceivers 211, 212, 213, 214 mounted outside of the vehicle 1 and outside the vehicle 1 is shown.

In this case, a case where the driver who owns the mobile key is not located within a predetermined distance with respect to the tail gate of the vehicle 1 is shown.

The vehicle 1 may control the first UWB transceiver 201, the second UWB transceiver 202, and the third UWB transceiver 203 mounted inside the vehicle to operate in at least one of a first mode or a second mode. For example, the second mode may be Rear Occupant Alert (ROA), but is not limited thereto. At this time, the controller 110 may control the plurality of UWB transceivers 201, 202, and 203 mounted inside the vehicle 10 in a standby mode for performing an ROA function.

The vehicle 1 may control the fourth UWB transceiver 211, the fifth UWB transceiver 212, the sixth UWB transceiver 213, and the seventh UWB transceiver 214 mounted outside of the vehicle 1 to operate in at least one of the first mode or the second mode. For example, the second mode may be to perform a Parking assistance system (PAS) function or a Real Cross-Traffic Collision-Avoidance-Assist (RCCA) function, but is not limited thereto.

Figure 5:
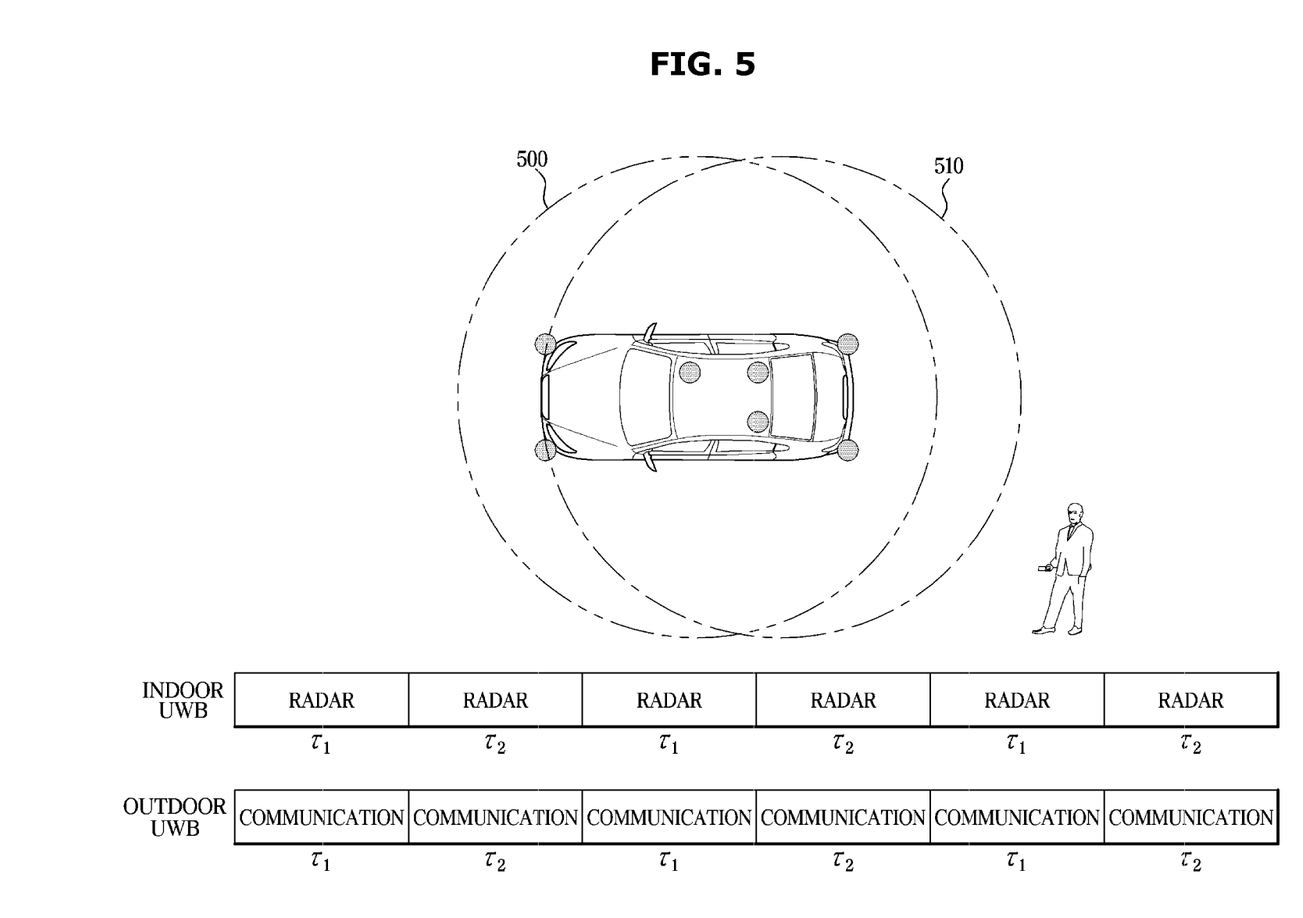
FIG. 5 is a plan view showing a location of a smart key in a vehicle equipped with a UWB transceiver according to an embodiment of the present disclosure.

Referring to FIG. 5, a case where it is determined that the driver possessing the mobile key is located outside of the communication range 500 of a plurality of UWB transceivers 201, 202, 203 mounted inside the vehicle 1, outside of the communication range 510 of a plurality of UWB transceivers 211, 212, 213, 214 mounted outside of the vehicle 1 and outside the vehicle 1 is shown.

The vehicle 1 may control the first UWB transceiver 201, the second UWB transceiver 202, and the third UWB transceiver 203 mounted inside the vehicle to operate in a second mode. For example, the second mode may be a Real Occupant Alert (ROA) function, but is not limited thereto. In this case, the controller 110 may control to perform the ROA function until it is determined that the mobile key is located within the communication range.

The vehicle 1 may control the fourth UWB transceiver 211, the fifth UWB transceiver 212, the sixth UWB transceiver 213, and the seventh UWB transceiver 214 mounted outside of the vehicle 1 to operate in the first mode.

Figure 6:
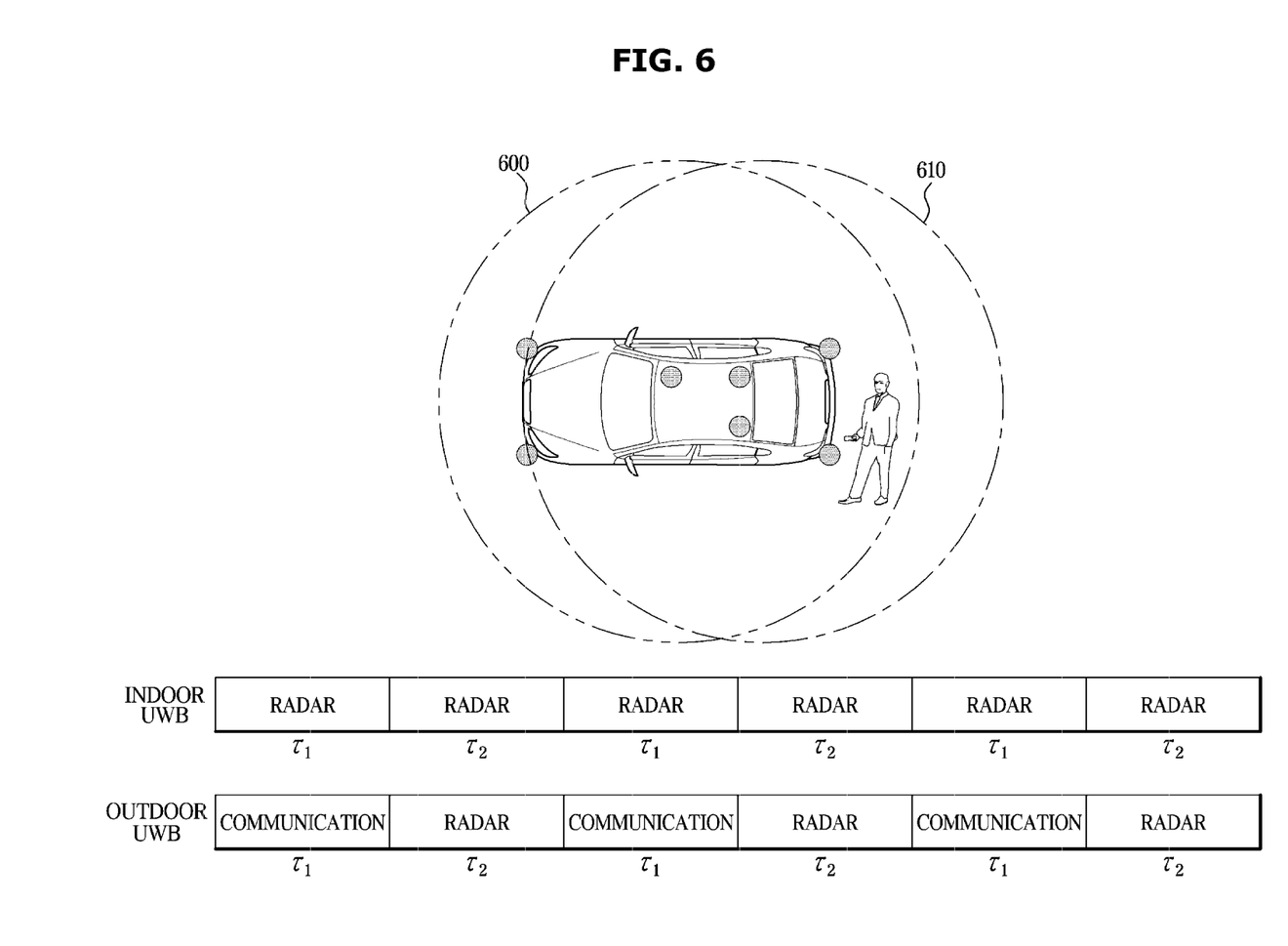
FIG. 6 is a plan view showing a location of a smart key in a vehicle equipped with a UWB transceiver according to an embodiment of the present disclosure.

Referring to FIG. 6, a case where it is determined that the driver possessing the mobile key is located inside of the communication range 600 of a plurality of UWB transceivers 201, 202, 203 mounted inside the vehicle 1, inside of the communication range 610 of a plurality of UWB transceivers 211, 212, 213, 214 mounted outside of the vehicle 1 and outside the vehicle 1 is shown.

FIG. 6 shows a case where the driver who owns the mobile key is located within a predetermined distance with respect to the tail gate of the vehicle 1.

The vehicle 1 may control the first UWB transceiver 201, the second UWB transceiver 202, and the third UWB transceiver 203 mounted inside the vehicle to operate in a second mode. For example, the second mode may be Rear Occupant Alert (ROA). The controller 110 may control the plurality of UWB transceivers 201, 202, and 203 mounted inside the vehicle 10 in a standby mode for performing an ROA function.

The vehicle 1 may control the fourth UWB transceiver 211, the fifth UWB transceiver 212, the sixth UWB transceiver 213, and the seventh UWB transceiver 214 mounted outside of the vehicle 1 to operate in at least one of the first mode and the second mode.

Figure 7:
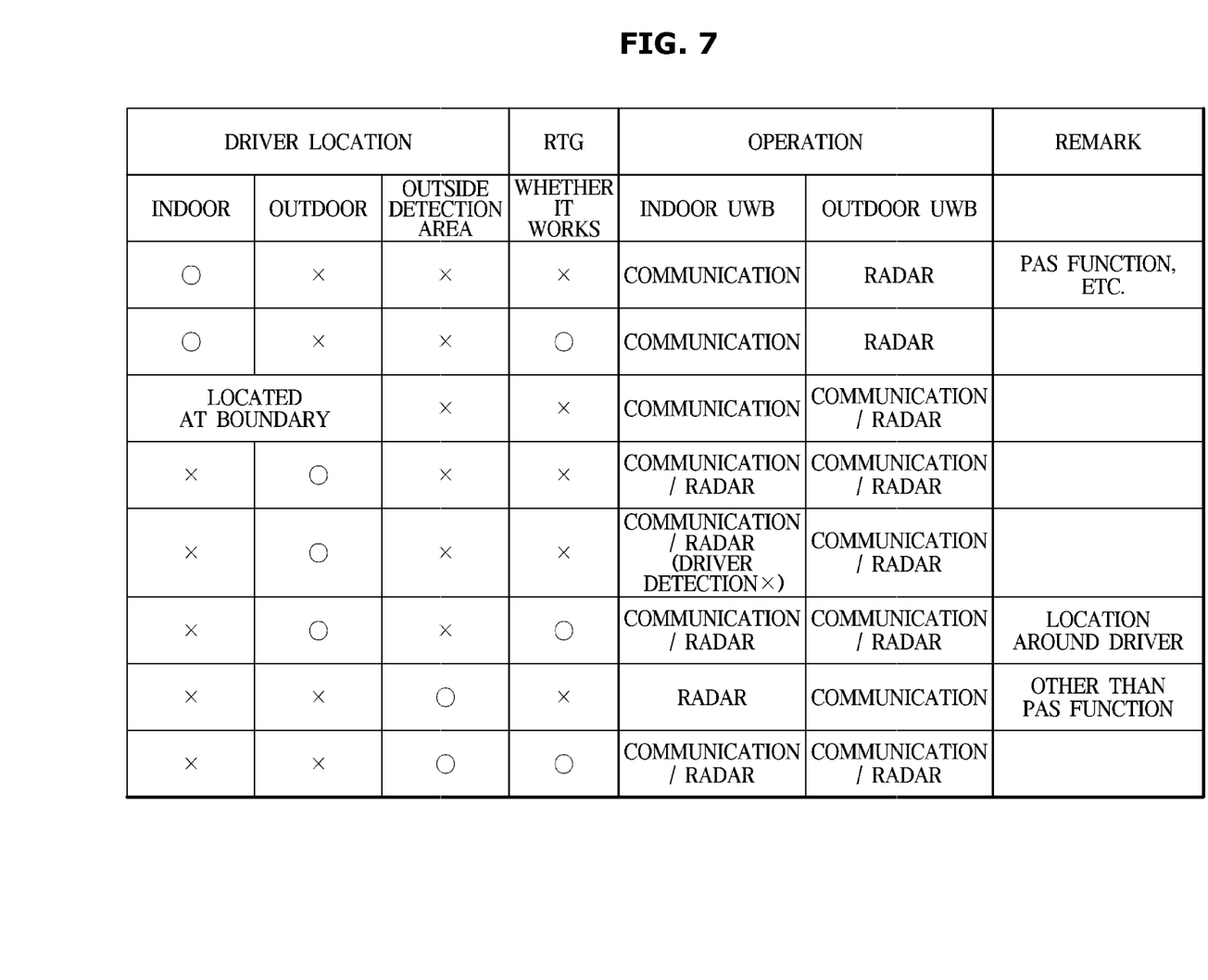
FIG. 7 shows a table for performing functions of a UWB transceiver according to another embodiment of the present disclosure.

FIG. 7 shows a table for performing functions of a UWB transceiver according to another embodiment of the present disclosure.

As shown in FIG. 7, when it is determined that the location of the driver who owns the mobile key is located inside the vehicle 1, regardless of whether the tail gate operates, the plurality of UWB transceivers 211, 212, 213, and 214 mounted outside the vehicle 1 may operate in a second mode. For example, the second mode may be a PAS function.

If the location of the driver who owns the mobile key is located outside the vehicle 1, but is determined to be located within the communication range, when the tail gate is operated, the plurality of UWB transceivers 100 mounted inside and outside the vehicle 1 may operate in at least one of the first mode and the second mode.

If the location of the driver who owns the mobile key is located outside the vehicle 1, but is determined not to be located within the communication range, when the tail gate is operated, the plurality of UWB transceivers 100 mounted inside and outside the vehicle 1 may operate in at least one of a first mode and a second mode. If the tail gate does not operate, the plurality of UWB transceivers 201, 202, and 203 mounted inside the vehicle 1 may operate in a second mode, for example, the second mode may be an ROA function.

Figure 8:
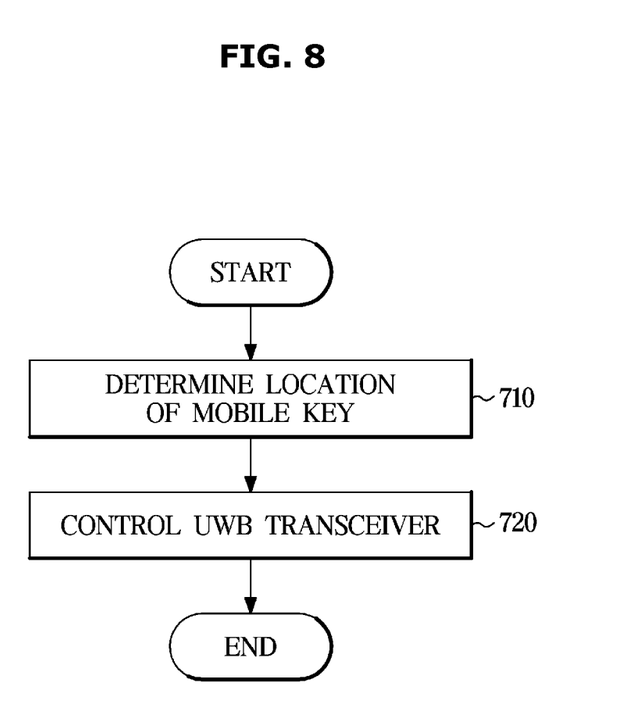
FIG. 8 is a flowchart illustrating a control method of a vehicle according to an embodiment of the present disclosure.

FIG. 8 is a flowchart illustrating a control method of a vehicle according to an embodiment of the present disclosure.

The vehicle 1 may obtain mobile key location information and determine the location of the mobile key (710).

In more detail, the vehicle 1 may determine whether the mobile key is located inside the vehicle 1, is located outside the vehicle 1 but is located within the communication range, is located outside of the vehicle 1 but is located outside the communication range.

In addition, when the mobile key is located outside the vehicle 1 and located within the communication range, the vehicle 1 may determine whether the mobile key is located within a predetermined distance with respect to the tail gate of the vehicle 1.

The vehicle 1 may control a plurality of UWB transceivers 100 based on the determined location of the mobile key (720).

In more detail, the vehicle 1 selectively operates the plurality of UWB transceivers 100 in at least one of a first mode communicating with the mobile key or a second mode detecting an object based on the location of the mobile key.

When it is determined that the mobile key is located inside the vehicle 1, the controller 110 may control the plurality of UWB transceivers mounted inside the vehicle 1 so that the plurality of UWB transceivers operate in first mode. The vehicle 1 may control the plurality of UWB transceivers mounted outside the vehicle 1 so that the plurality of UWB transceivers operate in second mode. In other words, the vehicle 1 may control the plurality of UWB transceivers located inside the vehicle 1 to operate in a first mode, and the plurality of UWB transceivers located outside the vehicle 1 to operate in a second mode.

If it is determined that the mobile key is located outside the vehicle, but located inside the communication range, and the mobile key is not located within a predetermined distance with respect to the tail gate of the vehicle 1, the vehicle may control the plurality of UWB transceivers 100 mounted inside the vehicle 1 so that the plurality of UWB transceivers 100 mounted inside the vehicle 1 operate in at least one of a first mode and a second mode. In other words, the vehicle 1 may control to operate by dividing the first mode and the second mode by using a time division in any one of the plurality of UWB transceivers 100 mounted on inside of the vehicle 1.

The disclosed embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

According to an embodiment of the present disclosure, by adding a radar function to an ultra wide band (UWB) sensor, there is an effect of increasing UWB utilization. In addition, by performing Rear Occupant Alert (ROA) and Parking Assistance System (PAS) functions through UWB, it is effective in reducing costs.

What is claimed is:

1. A vehicle comprising:
 a plurality of Ultra Wide Band (UWB) transceivers; and
 a controller configured to control the plurality of UWB transceivers to selectively operate, based on location information of a mobile key integrated with UWB functionality, in a first mode for communication with the mobile key and a second mode for detecting an obstacle,
 wherein, when the mobile key is located outside the vehicle located within a UWB communication range, and located outside a predetermined distance with respect to a tail gate of the vehicle, the controller is configured to control the plurality of UWB transceivers to operate in the first mode and the second mode, and
 wherein the second mode comprises at least one Rear Occupant Alert (ROA) function and, Parking Assistance System (PAS) function,
 wherein the plurality of UWB transceivers includes:
  first UWB transceivers disposed inside the vehicle; and
  second UWB transceivers disposed on an exterior of the vehicle,
 wherein, when the mobile key is located inside the vehicle, the controller is configured to control the first UWB transceivers to operate in the first mode, and
 wherein the controller is configured to acquire location information of the mobile key by using a Time of Flight (TOF) method for an authentication signal received from the mobile key.

2. The vehicle according to claim 1, wherein the plurality of UWB transceivers comprise a transmitter and a receiver.

3. The vehicle according to claim 2, wherein, when the mobile key is located outside the vehicle and is located within the UWB communication range, the controller is configured to determine whether the mobile key is located within the predetermined distance with respect to the tail gate of the vehicle.

4. The vehicle according to claim 3, wherein, when the mobile key is located outside the vehicle, located within the UWB communication range, and located outside the predetermined distance with respect to the tail gate of the vehicle, the controller is configured to control the second UWB transceivers to operate in the first mode and the second mode.

5. The vehicle according to claim 3, wherein, when the mobile key is located outside the vehicle, located within the UWB communication range, and located within the predetermined distance with respect to the tail gate of the vehicle, the controller is configured to control the first UWB transceivers to operate in the second mode.

6. The vehicle according to claim 3, wherein, when the mobile key is located outside the vehicle, located within the UWB communication range, and located within the predetermined distance with respect to the tail gate of the vehicle, the controller is configured to control the first UWB transceivers to operate in the first mode and the second mode.

7. The vehicle according to claim 2, wherein, when the mobile key is not located within the UWB communication range, the controller is configured to control the first UWB transceivers to operate in the second mode.

8. The vehicle according to claim 2, wherein, when the mobile key is not located within the communication range of the vehicle, the controller is configured to control the second UWB transceivers to operate in the first mode.

9. The vehicle according to claim 1, wherein, when the mobile key is located inside the vehicle, the controller is configured to control the second UWB transceivers to operate in the second mode.

10. A control method of a vehicle, the method comprising:
obtaining location information of a mobile key from a plurality of Ultra Wide Band (UWB) transceivers;
determining location information of the mobile key which is configured to perform a UWB function; and
controlling the plurality of UWB transceivers to selectively operate, based on the location information of the mobile key, in a first mode for communication with the mobile key and a second mode for detecting an obstacle; and
upon determining that the mobile key is located outside the vehicle, located within a UWB communication range, and located outside a predetermined distance with respect to a tail gate of the vehicle, controlling the plurality of UWB transceivers to operate in the first mode and the second mode,
wherein the second mode comprises at least one Rear Occupant Alert (ROA) function and, Parking Assistance System (PAS) function,
wherein the plurality of UWB transceivers includes:
first UWB transceivers disposed inside the vehicle; and
second UWB transceivers disposed on an exterior of the vehicle,
wherein the control method further includes:
upon determining that the mobile key is located inside the vehicle, controlling the first UWB transceivers to operate in the first mode; and
controlling the second UWB transceivers to operate in the second mode,
wherein a controller is configured to acquire location information of the mobile key by using a Time of Flight (TOF) method for an authentication signal received from the mobile key.

11. The control method according to claim 10, wherein the plurality of UWB transceivers comprise a transmitter and a receiver.

12. The control method according to claim 10, further comprising:
determining whether the mobile key is located within the UWB communication range; and
upon determining that the mobile key is located outside the vehicle and is located within the UWB communication range, determining whether the mobile key is located within the predetermined distance with respect to the tail gate of the vehicle.

13. The control method according to claim 12, further comprising, upon determining that the mobile key is located outside the vehicle, located within the UWB communication range, and located outside the predetermined distance with respect to the tail gate of the vehicle:
controlling the second UWB transceivers to operate in the first mode and the second mode.

14. The control method according to claim 12, further comprising, upon determining that mobile key is located outside the vehicle, located within the UWB communication range, and located within the predetermined distance with respect to the tail gate of the vehicle:
controlling the first UWB transceivers to operate in the second mode; and
controlling the second UWB transceivers to operate in the first mode and the second mode.

15. The control method according to claim 10, further comprising, upon determining that the mobile key is located outside the UWB communication range:
controlling the first UWB transceivers to operate in the second mode; and
controlling the second UWB transceivers to operate in the first mode.

* * * * *